(12) United States Patent
Mazur et al.

(10) Patent No.: US 6,408,616 B1
(45) Date of Patent: Jun. 25, 2002

(54) DIESEL OBD-II SYSTEM FOR DETECTION OF DEGRADATION OF CATALYST ACTIVITY

(75) Inventors: Christopher John Mazur; Paul Matthew Laing, both of Canton; Robert Henry Hammerle, Franklin, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/621,303

(22) Filed: Jul. 20, 2000

(51) Int. Cl.$^7$ ................................................. F01N 3/00
(52) U.S. Cl. ........................... 60/277; 60/274; 60/286
(58) Field of Search ...................... 60/274, 276, 277, 60/285, 286, 295

(56) References Cited

U.S. PATENT DOCUMENTS

| | | | |
|---|---|---|---|
| 5,177,463 A | * 1/1993 | Bradshaw et al. | 60/277 |
| 5,201,802 A | 4/1993 | Hirota et al. | |
| 5,625,750 A | * 4/1997 | Puskorius et al. | 60/274 |
| 5,626,014 A | 5/1997 | Hepburn et al. | |
| 5,628,186 A | * 5/1997 | Schmelz | 60/286 |
| 5,630,315 A | * 5/1997 | Theis | 60/277 |
| 5,649,420 A | 7/1997 | Mukaihira et al. | |
| 5,675,967 A | * 10/1997 | Ries-Mueller | 60/277 |
| 5,706,652 A | 1/1998 | Sultan | |
| 5,752,382 A | * 5/1998 | Hanafusa et al. | 60/277 |
| 5,806,310 A | * 9/1998 | Daidou et al. | 60/286 |
| 5,822,979 A | * 10/1998 | Hamburg et al. | 60/277 |
| 5,842,341 A | * 12/1998 | Kibe | 60/286 |
| 5,845,487 A | 12/1998 | Fraenkle et al. | |
| 5,860,277 A | * 1/1999 | Schnaibel et al. | 60/277 |
| 5,916,294 A | * 6/1999 | Naber et al. | 60/276 |
| 5,930,993 A | * 8/1999 | Kammann et al. | 60/277 |
| 5,938,715 A | 8/1999 | Zhang et al. | |
| 5,950,422 A | * 9/1999 | Dolling | 60/286 |
| 6,003,307 A | * 12/1999 | Naber et al. | 60/277 |
| 6,079,203 A | * 6/2000 | Wakamoto | 60/277 |
| 6,119,448 A | * 9/2000 | Emmerling et al. | 60/286 |
| 6,145,302 A | * 11/2000 | Zhang et al. | 60/277 |
| 6,202,406 B1 | * 3/2001 | Griffin et al. | 60/274 |
| 6,295,809 B1 | * 10/2001 | Hammerle et al. | 60/286 |

* cited by examiner

Primary Examiner—Thomas Denion
Assistant Examiner—Tu M. Nguyen
(74) Attorney, Agent, or Firm—Carlos Hanze

(57) ABSTRACT

A method of monitoring catalyst activity that includes injecting hydrocarbon into the engine exhaust flow sufficient to maintain a constant concentration of reductant into the catalyst under variable engine exhaust flow conditions thereby permitting an accurate calculation of the actual HC conversion by the catalyst, and a determination of whether the catalyst is currently meeting emission regulations.

10 Claims, 2 Drawing Sheets

DIESEL OBD-II SYSTEM FOR DETECTION OF DEGRADATION OF CATALYST ACTIVITY

TECHNICAL FIELD

This invention relates to on-board diagnostics and, more particularly, to an on-board diagnostic method and system for diesel vehicles that determines the current hydrocarbon (HC) conversion based on the exotherm generated by a reductant injection strategy and a theoretical exotherm assuming complete conversion of the injected hydrocarbon and provides an indication if the current HC tailpipe emittance exceeds a target threshold.

BACKGROUND ART

It is desirable to add reductant to the lean environment of diesel exhaust to reduce $NO_x$ emissions. When injecting reductant into the engine exhaust, the burning of hydrocarbons across the catalyst releases heat, which increases the post-catalyst temperature. This resulting rise in temperature is directly related to catalyst efficiency, the concentration of HC in the exhaust, and is a time dependent function of engine exhaust flow. As shown in FIG. 1, as the catalyst ages catalyst efficiency degrades, and HC light-off is delayed to higher catalyst temperatures. For a new vehicle, the catalyst is fresh and the secondary fuel injection system is fully functional, the catalyst efficiency is expected to be high, and the fuel injection quantity correct. Under these conditions, the degree of temperature rise, DT, should be at its maximum possible value. As the vehicle mileage increases and the catalyst ages, HC conversion efficiency decreases accordingly. This reduction in efficiency will reduce the degree of temperature rise, DT, from the fresh value. Monitoring the degree of temperature rise, DT, provides a means to estimate catalyst efficiency, which in turn can be used to infer whether required emission levels are being met. While temperature sensors have been used in the past to monitor catalyst activity (e.g., U.S. Pat. Nos. 5,201,802 and 5,706, 652), the prior art approaches have not used an injected reductant quantity specifically for and sized to enhance catalyst performance monitoring.

DISCLOSURE OF INVENTION

In accordance with the present invention, a method is proposed for evaluating catalyst efficiency by monitoring catalyst exotherm level. More particularly, a diesel diagnostic strategy for evaluating catalyst efficiency is proposed that includes injection of a sufficient amount of HC into the engine exhaust stream to maintain a constant concentration of reductant into the catalyst under variable engine exhaust flow conditions thereby permitting the calculation of a theoretical exotherm. The ratio of the actual to theoretical exotherm is calculated to provide an indication of the actual HC conversion by the catalyst. The actual conversion is compared to data for a catalyst aged to threshold emittance levels to determine whether the vehicle is meeting emission regulations.

BEST MODE FOR CARRYING OUT THE INVENTION

Figure 1:
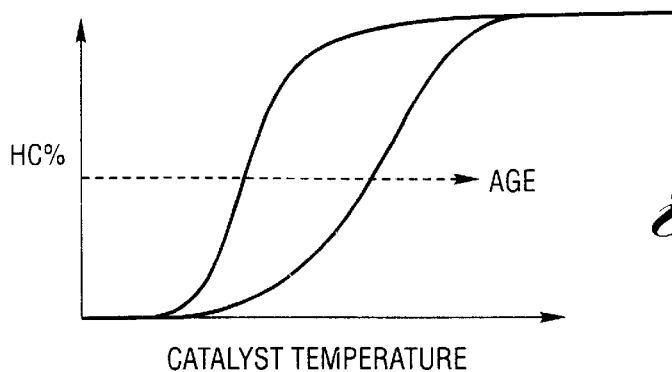
FIG. 1 is a graph showing the effects of age on catalyst efficiency.
Figure 2:
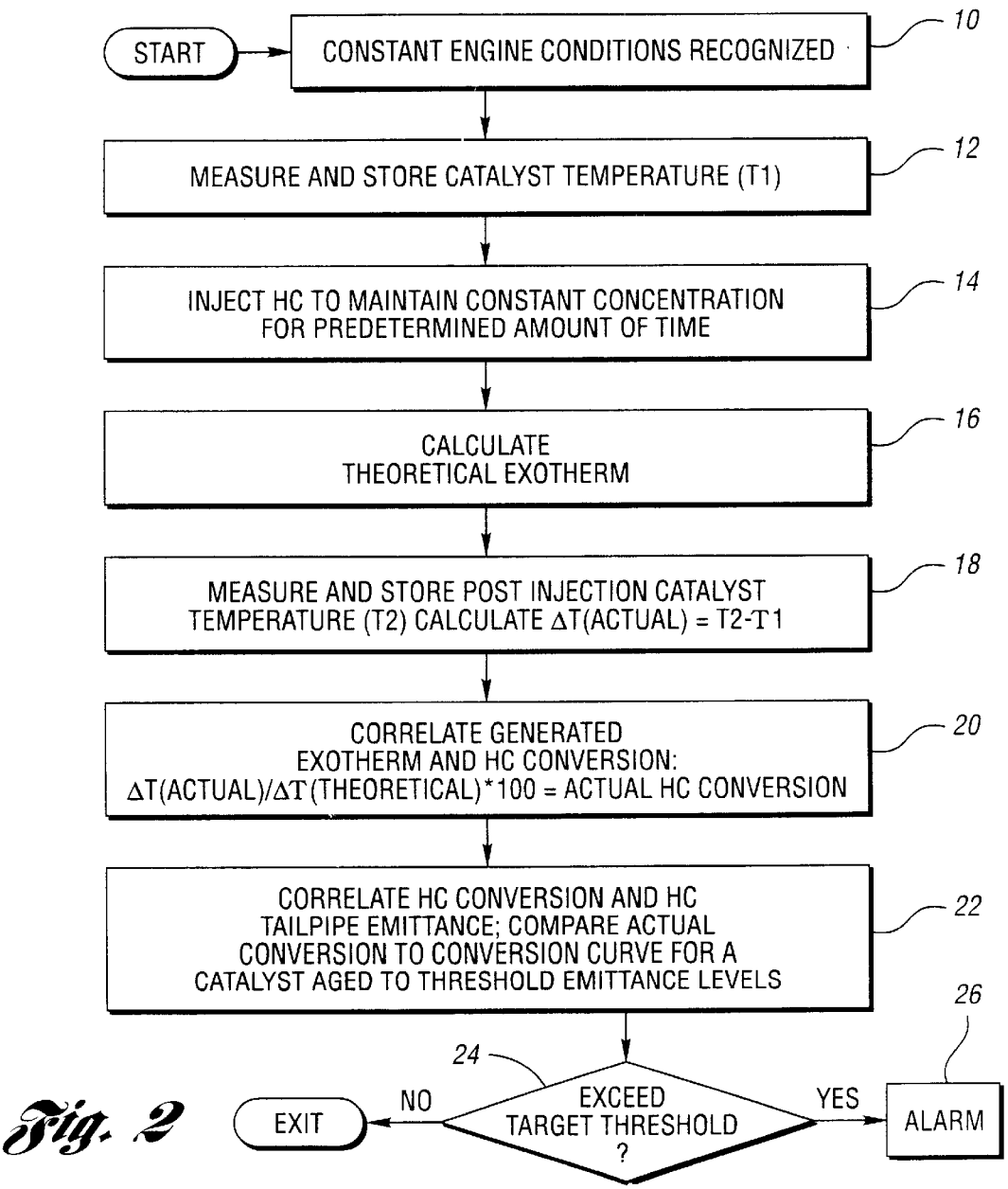
FIG. 2 is a flowchart of the on-board diagnostic method of the present invention.

Referring again to the drawings, and initially to FIG. 2, the method of the present invention is periodically performed and includes a step, generally indicated at 10, of recognizing predetermined engine conditions where catalyst temperature and engine exhaust flow are relatively constant, such as, for example, idle and highway driving. Upon recognition of these conditions, the catalyst inlet temperature T1 is measured and stored in computer memory as indicated at 12. An injection strategy, independent from the usual $NO_x$ reduction injection strategy, commands the introduction of an amount of HC into the exhaust to maintain a substantially constant concentration of HC (gram HC per gram of exhaust) as indicated at 14. The rate at which HC is injected (grams/second) will vary with changes in exhaust flow to ensure an effectively constant concentration of HC in the exhaust. Injecting a constant concentration of reductant permits calculation of the theoretical exotherm, $\Delta T(theoretical)$, as indicated at 16. The theoretical exotherm is the temperature increase expected across the catalyst assuming complete conversion of the injected HC and is calculated as follows:

$$\Delta T(theoretical) = X° C. * HC \text{ Injection Rate/Exhaust Flow Rate}$$

where X is dependent on the units used to express HC Injection Rate and Exhaust Flow Rate.

By controlling the amount of reductant injected, the generated exotherm is sized to be sufficiently large to ensure that it is detectable considering the sensitivity of the temperature measuring devices. After waiting for a time duration determined experimentally or by a catalyst heat transfer model stored in the engine computer, the post-injection catalyst temperature (T2) is measured and the actual exotherm, $\Delta T(actual)$, is determined and stored at 18. The actual exotherm is based on the difference between T2 and T1. At block 20, a correlation is made between generated exotherm and HC conversion as follows:

$$\text{Actual HC Conversion} = \Delta T(actual)/\Delta T(theoretical)$$

Figure 2A:
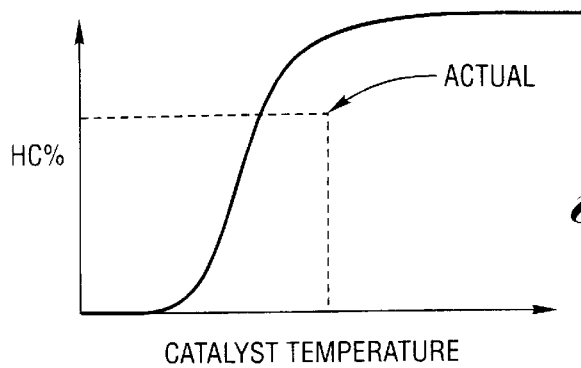

This value is an indication of the current HC conversion. At block 22, a correlation is made between current or actual HC conversion and HC tailpipe emittance. If the current HC conversion and catalyst temperature during reductant injection yield a point that is below a curve of catalyst efficiency representative of catalyst performance, which is the minimum required to meet the tailpipe emission requirement, also referred to as the threshold performance curve shown in FIG. 2a, then the catalyst is currently not meeting emission regulations, and a decision is made at block 24 to energize a malfunction indicator lamp (MIL) or other alarm as indicated in block 26. Otherwise, the routine is exited.

The injection duration of the reductant is dependent on the temperature time delay of the catalyst, which is defined as the time it takes for the post-catalyst thermocouple to register the heat generated from the exhaust fuel injection. This temperature time constant is dependent on the engine exhaust flow, the thermal inertia of the catalyst, and the thermal properties of the catalyst. The time allotment for the injection test, i.e., the time spent at constant engine conditions must be greater than the time allotment required for heat transfer across the catalyst.

A table derived experimentally or calculated using a catalyst heat transfer model listing the temperature time constant and corresponding engine exhaust flow is stored in the engine computer and called upon during OBD injection testing. The absence of the expected exotherm in this time allotment may indicate a degradation in catalyst performance or a malfunction of the reductant injector. A driving condition change during the time allotment, i.e., hard acceleration or deceleration, cancels the OBD injection test. The sensitivity of this trigger is programmed into the engine computer.

Figure 3:
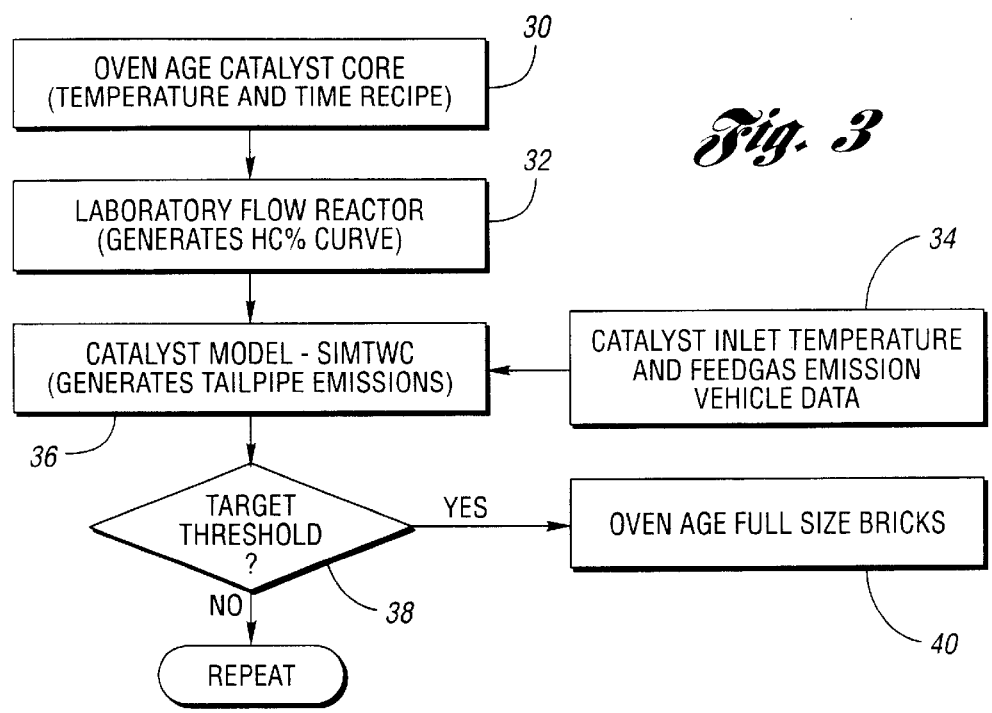
FIG. 3 is a flowchart of the verification process for a catalyst at the threshold performance level.

The proposed strategy to monitor catalyst efficiency requires a curve of HC conversion versus catalyst temperature for a catalyst whose depleted activity corresponds to federal threshold emittance levels of the limiting pollutant. These data are stored in the engine computer as a threshold performance curve. Obtaining this data could involves catalyst oven aging, a laboratory flow reactor, and a catalyst model to rapidly determine bench aging conditions that correspond to a catalyst at the threshold performance level. With reference to FIG. 3, the catalyst is oven-aged for a predetermined temperature and duration in air with a predetermined concentration of water as indicated at block 30. Laboratory flow reactor testing yields HC conversion as a function of catalyst temperature as indicated at block 32. This data, and catalyst inlet temperature and feedgas emission vehicle data from block 34, is utilized by a catalyst model, as indicated at 36, that generates predicted tailpipe emission levels. When the predicted emission values are equal to the federal threshold levels, as determined at decision block 38, a full-sized catalyst is oven aged under the same conditions as indicated at block 40. The full-size catalyst is then tested on a vehicle to verify that the federal threshold levels of the limiting pollutant are emitted. Upon verification, the catalyst is used to generate the Threshold HC conversion versus Catalyst Temperature curve (FIG. 2a) that is stored in the engine computer.

Figure 4:
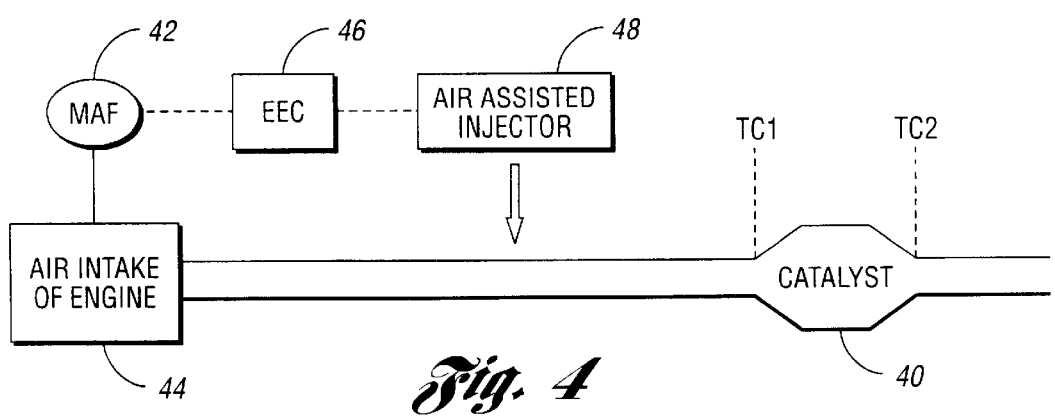
FIG. 4 is a schematic block diagram of the constant reductant concentration injection system of the present invention.

With reference to FIG. 4, the constant reductant concentration injection system of the present invention includes a pre-catalyst and post-catalyst thermocouples TC1 and TC2, respectively, that are placed one inch from the face of the brick of catalyst 40. To compensate for variations in engine exhaust flow, a MAF sensor 42 measuring air flow into the engine 44 is used by the engine computer (EEC) 46 together with an estimate of the engine fuel demand (also calculated in the engine computer) to calculate engine exhaust flow=air flow+fuel demand. The engine computer varies the command signal to the injector 48 in response to changes in exhaust flow to maintain a constant concentration of hydrocarbon flowing into the catalyst 40.

While the best mode for carrying out the invention has been described in detail, those familiar with the art to which this invention relates will recognize various alternative designs and embodiments for practicing the invention as defined by the following claims.

What is claimed is:

1. A method of on-board vehicle monitoring the performance of a catalyst treating the exhaust stream of a diesel engine, comprising a sequence of the following steps:

detecting a predetermined engine operating condition;

determining the catalyst inlet temperature;

introducing reductant from a secondary fuel supply into the exhaust stream after combustion of fuel by said engine in order to maintain a substantially constant concentration of hydrocarbon in the exhaust stream over a predetermined interval of time;

calculating a theoretical exotherm based on said substantially constant hydrocarbon concentration;

determining the catalyst outlet temperature;

calculating the actual exotherm based on the difference between the catalyst input temperature prior to introduction of said reductant and the catalyst output temperature at the end of said predetermined time interval;

calculating a current hydrocarbon conversion value from said actual and theoretical exotherms;

comparing the hydrocarbon conversion value to a value indicative of a target threshold emittance level; and providing an indication when said target threshold emittance level is exceeded.

2. The method of claim 1 wherein the hydrocarbon conversion value is the ratio of said actual exotherm to said theoretical exotherm.

3. The method of claim 2 wherein the predetermined engine operating condition produces a relatively constant catalyst temperature and engine exhaust flow.

4. The method of claim 3 wherein the predetermined engine operating condition is a substantially constant engine speed.

5. The method of claim 4 wherein the predetermined engine operating condition is either engine idle or highway driving.

6. The method of claim 5 wherein the step of introducing a reductant into the exhaust stream includes the steps of:

measuring air flow into the engine;

calculating the exhaust flow rate from the measured air flow and engine fuel demand and;

controlling an injector in said secondary fuel injection system for injecting hydrocarbon into the exhaust stream to maintain said constant concentration.

7. The method of claim 5 wherein said predetermined time interval is dependent on the temperature time delay of the catalyst.

8. An on-board diagnostic system for monitoring the performance of a catalyst treating an exhaust stream of a diesel engine comprising:

means for detecting a predetermined engine operating condition;

a sensor for determining catalyst inlet and outlet temperatures;

a secondary fuel supply for introducing reductant into the exhaust stream as a function of exhaust gas flow to provide a substantially constant concentration of hydrocarbon in the exhaust stream over a predetermined interval of time;

means for calculating a theoretical exotherm based on said concentration;

means for calculating the actual exotherm based on the difference between the catalyst input temperature prior to introduction of said reductant and the catalyst output temperature after said predetermined time interval;

means for calculating a current hydrocarbon conversion value from said actual and theoretical exotherms; and means for providing an indication when the current hydrocarbon conversion value exceeds a target threshold emittance level.

9. The system defined in claim 8 wherein said means for introducing a constant concentration of reductant into the exhaust stream comprises a sensor measuring air flow into the engine and a computer for calculating the exhaust flow rate from measured air flow and engine fuel demand and controlling an injector for injecting hydrocarbon into the exhaust stream to maintain a constant concentration of hydrocarbon flowing into the catalyst.

10. A method of on-board vehicle monitoring of the performance of a catalyst treating an exhaust stream of a diesel engine, comprising a sequence of the following steps:

detecting a predetermined engine operating condition;

determining the catalyst inlet temperature;

introducing a reductant from a secondary fuel supply into the exhaust stream as a function of exhaust gas flow to maintain a substantially constant concentration of hydrocarbon to the catalyst for a predetermined period of time;

calculating a theoretical exotherm during said predetermined period of time;

determining the catalyst outlet temperature at the end of said predetermined period of time;

calculating the actual exotherm based on the difference between the catalyst input temperature prior to introduction of said reductant and the catalyst output temperature after said predetermined time interval;

calculating the actual hydrocarbon conversion value from said actual and theoretical exotherms;

comparing the hydrocarbon conversion value to a target threshold emittance level; and providing an indication when said target threshold emittance level is exceeded.

* * * * *